J. B. COLLINS.
DISH.
APPLICATION FILED JUNE 20, 1910.

980,066.

Patented Dec. 27, 1910.

Witnesses:

Inventor,
Joseph B. Collins,

UNITED STATES PATENT OFFICE.

JOSEPH B. COLLINS, OF SAN JOSE, CALIFORNIA, ASSIGNOR OF ONE-HALF TO HUGH COLLINS, OF SAN JOSE, CALIFORNIA.

DISH.

980,066.  Specification of Letters Patent.  Patented Dec. 27, 1910.

Application filed June 20, 1910.  Serial No. 567,836.

*To all whom it may concern:*

Be it known that I, JOSEPH B. COLLINS, citizen of the United States, residing at San Jose, in the county of Santa Clara and State of California, have invented new and useful Improvements in Dishes, of which the following is a specification.

My invention relates to dishes for table use.

It consists in a means for closing the dish and providing for the dispensing of its contents without removing the cover.

It also consists in the parts, combination of parts and details of construction, which will be more fully explained by reference to the accompanying drawings, in which—

Figure 1:
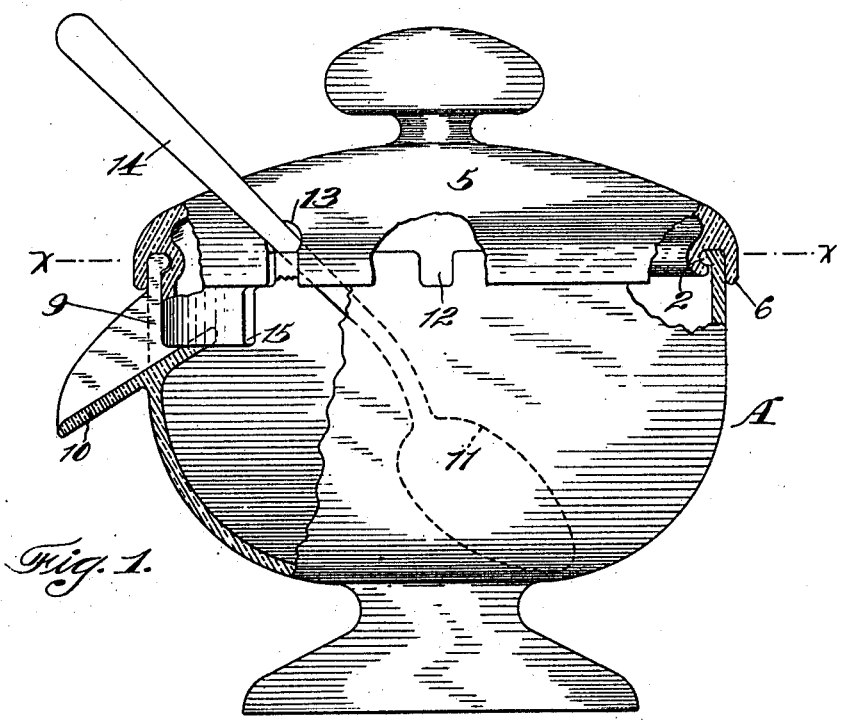
Figure 2:
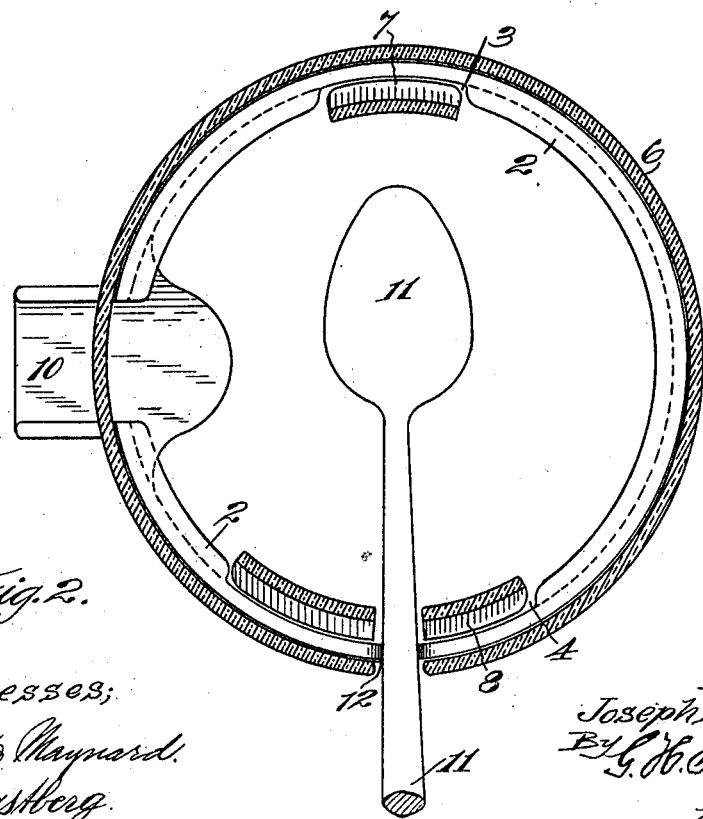

Figure 1 is an elevation and partial section. Fig. 2 is a horizontal section on line X X of Fig. 1.

It is the object of my invention to provide a dish having a cover with interlocking means whereby it may be held firmly upon the dish, and means by which a spoon or dispensing device may be introduced through the wall of the dish and the cover, a discharge chute at one side of the dish into which the contents may be delivered by the spoon, and a curtain or means by which this discharge passage may also be closed when not in use.

In the drawings A represents a dish of any suitable character. I show the dish having an inturned flange 2 around the top, and this flange is interrupted or cut away at certain points, as indicated at 3 and 4. The cover 5 has a flange 6 around its edge, which flange is adapted to slip down over the exterior of the bowl rim. The cover has also inturned flanges 7 and 8, which form with the flange 6 a groove or channel fitting over the flange 2 of the bowl. The cut-away portions 3—4 of the flange 2 are respectively of a length equal to the respective lengths of the inturned flanges 7—8 of the cover, so that when the cover has been turned to a point where these flanges register with the respective cut-away portions of the bowl flange, the cover may be lifted from the bowl, but at any other point to which the cover may be turned the flanges engage and retain the cover in position.

Upon one side of the bowl is made an opening 9 and a chute 10 forms the bottom of this opening. This chute is preferably inclined, as shown in Fig. 1, so that anything placed upon it will readily flow out. The chute extends a short distance outside of the dish and also extends a little way into the interior thereof. In order to deliver the contents of the dish or bowl into the chute, I may employ a spoon or other lifting device, as at 11.

The edge of the bowl has a notch or depression 12, in which the handle of the spoon may drop, and the cover has also a notch or depression 13, each of which are of sufficient size to allow the handle 14 of the spoon or other article to pass through. When these grooves or notches are brought into position to register with each other, the flanges 7—8 of the cover will register with the cut-away portions 3—4 so that the cover may be removed. I have here shown these notches so made that when the spoon or article is to be used to deliver substances from the dish or bowl, the spoon handle may be first lifted into the notch 13, then the cover may be turned around until the bowl 11 of the spoon is in position to lift articles and deliver them upon the inwardly projecting shelf portion of the chute 10, this being done without uncovering or exposing the interior of the dish, and the incline of the chute will be sufficient to discharge such articles. Thus, olives, preserved cherries or other fruits may be dispensed from the bowl without removing the cover at all.

In order to close the opening 9 and the chute 10, the cover of the bowl is provided with a downwardly extending curtain or flange 15, which is so disposed that when the cover has been turned locking it upon the top of the dish or bowl, this curtain will extend across the opening 9 and thus prevent the entrance of any insects, dust, or other noxious or undesirable substances.

Having thus described my invention, what I claim and desire to secure by Letters Patent is—

1. A dispensing dish or bowl having an opening and an inclined chute at one side, a rotatable cover with means interlocking it with the upper edge of the dish, said cover having a notch or depression for the reception of a spoon or like handle, and said cover being turnable in contact with the spoon to bring the bowl of the spoon into desired relative position with the discharge chute of the dish.

2. A dish or bowl having an inturned flange around its edge with opposed cut-away portions of different length, a rotatable cover having exterior and interior flanges forming grooves or channels adapted to fit the dish flange, said inturned cover flanges being respectively of a length to register with the opposed cut-away portions of the dish flange, and said dish and cover having notches or depressions for the passage of a spoon or like handle, said notches being made to register by the turning of the cover upon the dish.

3. A dispensing dish having an opening in one side near the top, with an inclined chute extending from the interior across the bottom of said opening, a rotatable cover having a curtain adapted to close the discharge opening, said cover and dish having interlocking flanges and cut-away portions whereby the cover may be removed from the dish, and said cover and dish having notches or depressions adapted to be moved into or out of register and to receive the handle of the spoon whereby the contents of the dish may be lifted to the discharge chute without removing the cover.

In testimony whereof I have hereunto set my hand in the presence of two subscribing witnesses.

JOSEPH B. COLLINS.

Witnesses:
CHARLES A. PENFIELD,
CHARLES EDELMAN.